(12) United States Patent
Adams et al.

(10) Patent No.: US 7,802,306 B1
(45) Date of Patent: Sep. 21, 2010

(54) MULTIPLE WATERMARKS FOR DIGITAL RIGHTS MANAGEMENT (DRM) AND CONTENT TRACKING

(75) Inventors: Cheryl Adams, Cary, NC (US); Gregory Morgan Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 823 days.

(21) Appl. No.: 11/565,013

(22) Filed: Nov. 30, 2006

(51) Int. Cl.
*G06F 7/04* (2006.01)
*G06F 17/30* (2006.01)
*H04N 7/16* (2006.01)
*H04L 29/06* (2006.01)
*H04L 9/32* (2006.01)

(52) U.S. Cl. .............................. 726/26; 726/27; 726/28; 726/29; 726/30; 713/155; 713/156; 713/176; 713/177

(58) Field of Classification Search ......... 713/175–177, 713/155–156; 726/26–33; 709/217
See application file for complete search history.

(56) References Cited

U.S. PATENT DOCUMENTS

| | | | |
|---|---|---|---|
| 5,613,004 A | | 3/1997 | Cooperman et al. |
| 5,687,236 A | | 11/1997 | Moskowitz et al. |
| 5,809,139 A | | 9/1998 | Girod et al. |
| 5,905,800 A | * | 5/1999 | Moskowitz et al. ............ 380/28 |
| 6,141,753 A | | 10/2000 | Zhao et al. |
| 6,282,299 B1 | | 8/2001 | Tewfik et al. |
| 6,389,541 B1 | | 5/2002 | Patterson |
| 6,567,107 B1 | * | 5/2003 | Stannard ..................... 715/764 |
| 6,735,699 B1 | | 5/2004 | Sasaki et al. |
| 6,738,493 B1 | | 5/2004 | Cox et al. |
| 6,751,670 B1 | | 6/2004 | Patterson |

(Continued)

FOREIGN PATENT DOCUMENTS

GB 2306869 A 5/1997

(Continued)

OTHER PUBLICATIONS

Jiri Fridrich, "Methods for data hiding," (working paper), 1997, 33 pages, Center for Intelligent Systems & Department of Systems Science and Industrial Engineering, SUNY Binghamton, http://74.125.47.132/search?q=cache:unDoOhDSrQYJ:www.ws.binghamton.edu/fridrich/Research/meth_ps.ps+Fridrich+Methods+for+Data+Hiding&hl=en&ct=clnk&cd=5&gl=us.

(Continued)

*Primary Examiner*—Taghi T Arani
*Assistant Examiner*—Madhuri Herzog
(74) *Attorney, Agent, or Firm*—Withrow & Terranova, PLLC

(57) ABSTRACT

A system and method for providing Digital Rights Management (DRM) using multiple watermarks are disclosed. In one embodiment, upon purchase of a digital asset, a copy of the digital asset that is watermarked with a content specific watermark and a user, or purchaser, specific watermark and a digital certificate including content specific watermark information and user specific watermark information corresponding to the watermarks in the copy of the digital asset are generated. The copy of the digital asset and the digital certificate are provided to the user. Thereafter, access to the copy of the digital asset is controlled based on a comparison of the watermarks in the copy of the digital asset and the watermark information in the digital certificate.

22 Claims, 10 Drawing Sheets

U.S. PATENT DOCUMENTS

| | | | |
|---|---|---|---|
| 6,804,779 | B1 | 10/2004 | Carroni et al. |
| 6,975,743 | B2 | 12/2005 | Venkatesan et al. |
| 6,987,985 | B2 | 1/2006 | Purkayastha et al. |
| 7,065,607 | B2 | 1/2006 | England et al. |
| 7,003,131 | B2 | 2/2006 | Watson et al. |
| 7,016,668 | B2 | 3/2006 | Vaidyanathan et al. |
| 7,020,304 | B2 | 3/2006 | Alattar et al. |
| 7,036,024 | B2 | 4/2006 | Watson |
| 7,167,599 | B1* | 1/2007 | Diehl ........................ 382/280 |
| 7,409,556 | B2 | 8/2008 | Wu et al. |
| 2001/0051996 | A1* | 12/2001 | Cooper et al. ............... 709/217 |
| 2002/0010759 | A1 | 1/2002 | Hitson et al. |
| 2002/0049580 | A1 | 4/2002 | Kutaragi et al. |
| 2002/0054578 | A1 | 5/2002 | Zhang et al. |
| 2002/0057799 | A1* | 5/2002 | Kohno ........................ 380/228 |
| 2002/0061029 | A1 | 5/2002 | Dillon |
| 2002/0104003 | A1 | 8/2002 | Iwamura |
| 2002/0104099 | A1 | 8/2002 | Novak |
| 2002/0129367 | A1 | 9/2002 | Devara |
| 2002/0144267 | A1 | 10/2002 | Gutta et al. |
| 2002/0156842 | A1 | 10/2002 | Signes et al. |
| 2002/0168082 | A1 | 11/2002 | Razdan |
| 2003/0009769 | A1 | 1/2003 | Hensgen et al. |
| 2003/0012403 | A1 | 1/2003 | Rhoads et al. |
| 2003/0050055 | A1 | 3/2003 | Ting et al. |
| 2003/0081580 | A1 | 5/2003 | Vaidyanathan et al. |
| 2003/0093665 | A1 | 5/2003 | Cooper et al. |
| 2003/0138127 | A1* | 7/2003 | Miller et al. ................ 382/100 |
| 2003/0161268 | A1 | 8/2003 | Larsson et al. |
| 2004/0008864 | A1 | 1/2004 | Watson et al. |
| 2004/0010692 | A1 | 1/2004 | Watson |
| 2004/0010694 | A1 | 1/2004 | Collens et al. |
| 2004/0030798 | A1 | 2/2004 | Andersson et al. |
| 2004/0042421 | A1 | 3/2004 | Mahany |
| 2004/0070593 | A1 | 4/2004 | Neely et al. |
| 2004/0083487 | A1 | 4/2004 | Collens et al. |
| 2004/0086122 | A1 | 5/2004 | Watson |
| 2004/0088549 | A1* | 5/2004 | Ukai et al. .................. 713/175 |
| 2004/0088557 | A1 | 5/2004 | Malcolm et al. |
| 2004/0117824 | A1 | 6/2004 | Karaoguz et al. |
| 2004/0131184 | A1 | 7/2004 | Wu et al. |
| 2004/0139047 | A1 | 7/2004 | Rechsteiner et al. |
| 2004/0156528 | A1 | 8/2004 | Joo et al. |
| 2004/0187005 | A1 | 9/2004 | Molaro |
| 2004/0234099 | A1 | 11/2004 | Venkatesan et al. |
| 2004/0248615 | A1 | 12/2004 | Purkayastha et al. |
| 2004/0263941 | A1 | 12/2004 | Chen et al. |
| 2004/0264372 | A1 | 12/2004 | Huang |
| 2005/0008017 | A1 | 1/2005 | Datta et al. |
| 2005/0034001 | A1 | 2/2005 | Pontarelli |
| 2005/0050103 | A1 | 3/2005 | Kesteloot et al. |
| 2005/0081042 | A1* | 4/2005 | Venkatesan et al. ......... 713/176 |
| 2005/0086069 | A1 | 4/2005 | Watson et al. |
| 2005/0097331 | A1 | 5/2005 | Majidimehr et al. |
| 2005/0108769 | A1 | 5/2005 | Arnold et al. |
| 2005/0120127 | A1 | 6/2005 | Bradley et al. |
| 2005/0125405 | A1 | 6/2005 | Watson et al. |
| 2005/0182989 | A1 | 8/2005 | Zarnke et al. |
| 2005/0183120 | A1 | 8/2005 | Jain et al. |
| 2005/0192987 | A1 | 9/2005 | Marsh |
| 2005/0201726 | A1 | 9/2005 | Malcolm et al. |
| 2005/0216942 | A1 | 9/2005 | Barton |
| 2005/0220321 | A1 | 10/2005 | Langelaar |
| 2005/0239497 | A1 | 10/2005 | Bahl et al. |
| 2005/0286438 | A1 | 12/2005 | Rajkotia |
| 2006/0010274 | A1 | 1/2006 | Olson |
| 2006/0015735 | A1 | 1/2006 | Kudo et al. |
| 2006/0047967 | A1 | 3/2006 | Akhan et al. |
| 2006/0048185 | A1 | 3/2006 | Alterman |
| 2006/0048186 | A1 | 3/2006 | Alterman |
| 2006/0050880 | A1 | 3/2006 | Taylor et al. |
| 2006/0053452 | A1 | 3/2006 | Lee et al. |
| 2006/0056349 | A1 | 3/2006 | Nakatugawa et al. |
| 2006/0059560 | A1 | 3/2006 | Montulli |
| 2006/0072786 | A1 | 4/2006 | Watson et al. |
| 2006/0075243 | A1 | 4/2006 | Lakamp et al. |
| 2006/0085830 | A1 | 4/2006 | Bruck et al. |
| 2006/0095401 | A1 | 5/2006 | Krikorian et al. |
| 2006/0095471 | A1 | 5/2006 | Krikorian et al. |
| 2006/0095472 | A1 | 5/2006 | Krikorian et al. |
| 2006/0095792 | A1 | 5/2006 | Hurtado et al. |
| 2006/0123235 | A1 | 6/2006 | Vanstone |
| 2006/0127037 | A1 | 6/2006 | Van Hoff et al. |
| 2006/0133644 | A1 | 6/2006 | Wells et al. |
| 2006/0156003 | A1* | 7/2006 | Zhang et al. ................ 713/176 |
| 2006/0161776 | A1 | 7/2006 | Van Der Veen et al. |
| 2006/0165169 | A1 | 7/2006 | Ng et al. |
| 2006/0173794 | A1 | 8/2006 | Sellars et al. |
| 2006/0174128 | A1 | 8/2006 | Yuval |
| 2006/0200416 | A1 | 9/2006 | White et al. |
| 2007/0133673 | A1 | 6/2007 | Imaizumi |
| 2008/0044087 | A1 | 2/2008 | Levy et al. |
| 2009/0037388 | A1 | 2/2009 | Cooper et al. |
| 2009/0287837 | A1 | 11/2009 | Felsher |

FOREIGN PATENT DOCUMENTS

| | | | |
|---|---|---|---|
| WO | 2006/046099 | A3 | 5/2006 |

OTHER PUBLICATIONS

No Author, "Gefen HDMI Cat-5 Extreme User Manual," (manual), 2006, 16 pages, Gefen Inc.

No Author, "Global-Link Product Manual Rev. C—Jan. 2005," (manual), Jan. 2005, 68 pages, Logical Solutions, http://www.thinklogical.com/documents/Global-Link_Manual_Rev_C.pdf.

No Author, "XTENDEX HDTV Extender," (website), 2005, 2 pages, http://www.networktechinc.com/pdf/cat-hdtv-extend.pdf.

No Author, "Get the eye, get Purelink," (website), obtained Jul. 13, 2007, 2 pages, http://www.dtrovision.com.

No Author, "Secure KVM over IP: Global-link—Thinklogical," (website), obtained Jul. 13, 2007, 1 page, http://www.thinklogical.com/products/globalLink.php.

No Author, "XTENDEX Series ST-C5DVI-150, 150 Foot DVI Video Extender Installation and Operation Manual Software Version 1.2," (manual), Oct. 4, 2006, 11 pages, http://www.networktechinc.com/pdf/man063.pdf.

No Author, "MediaMax Axonix Corporation," (website), obtained Jul. 13, 2007, 2 pages, http://www.axonix.com/mediamax/.

No Author, "Kaleidescape—Home," (website), obtained Jul. 13, 2007, 1 page, http://www.kaleidescape.com.

E. Setton, T. Yoo, X. Zhu, A. Goldsmith, and B. Girod, "Cross-Layer Design of Ad Hoc Networks for Real-Time Video Streaming," IEEE Wireless Communications, vol. 12, issue 4, pp. 99-102, Aug. 2005.

PC Connection, http://www.pcconnection.com/ProductDetail?sku=5373172&SourceID=k40132, 2006.

Vijay T. Raisinghani et al., "ECLAIR: An Efficient Cross Layer Architecture for Wireless Protocol Stacks," 5th World Wireless Congress, San Francisco, CA, May 25-28, 2004.

Vineet Srivastava et al., "Cross-Layer Design: A Survey and the Road Ahead," IEEE Communications Magazine, pp. 112-119, Dec. 2005.

Jana Dittmann et al., "Robust MPEG Video Watermarking Technologies," 1998.

Paul Judge and Mostafa Ammar, "WHIM: Watermarking Multicast Video with a Hierarchy of Intermediaries," Computer Networks: The International Journal of Computer and Telecommunications Networking archive, 2002, pp. 699-712, vol. 39, Issue 6.

E. Koch and J. Zaho, "Towards Robust and Hidden Image Copyright Labeling," IEEE Workshop on Nonlinear Signal and Image Processing, 1995, pp. 452-455.

Jiri Fridrich, "Applications of Data Hiding in Digital Images," Tutorial for the ISPACS '98 Conference in Melbourne, Australia, Nov. 4-6, 1998.

* cited by examiner

MULTIPLE WATERMARKS FOR DIGITAL RIGHTS MANAGEMENT (DRM) AND CONTENT TRACKING

FIELD OF THE INVENTION

The present invention relates to digital watermarking and more particularly relates to Digital Rights Management (DRM) based on multiple watermarks.

BACKGROUND OF THE INVENTION

The number of online purchases of digital assets such as computer programs, video games, songs, movies, and the like has exponentially increased over the past several years. In a traditional transaction, a user purchases a copy of a digital asset and has the rights to access only that particular copy of the digital asset. However, this results in a point of contention between the purchaser and the distributor of the digital asset. Many purchasers feel that they should be able to access the digital asset in general and should not be limited to accessing only the particular copy that they purchased. This is particularly the case when the copy of a digital asset purchased by a user becomes lost or corrupted due to, for example, a hard-drive failure. In this scenario, it would be desirable for the user to be able to obtain a copy of the digital asset from a friend or some other source. Thus, there is a need for a system and method providing Digital Rights Management (DRM) in a manner that permits a user to access both the particular copy of a digital asset purchased by the user as well as copies of the digital asset purchased by other users.

SUMMARY OF THE INVENTION

The present invention relates to a system and method providing Digital Rights Management (DRM) using multiple watermarks. In one embodiment, upon purchase of a digital asset, a copy of the digital asset and a digital certificate providing access to the copy of the digital asset are generated and provided to the user. The copy of the digital asset is watermarked with a content specific watermark and a user, or purchaser, specific watermark. The digital certificate includes content specific watermark information and user specific watermark information corresponding to the watermarks in the copy of the digital asset. Access to the copy of the digital asset is controlled based on a comparison of the watermarks in the copy of the digital asset and the watermark information in the digital certificate.

The DRM technique of the present invention also enables sharing of a digital asset. More specifically, in one embodiment, a first user may purchase a copy of the digital asset having a content specific watermark that is common among all copies of the digital asset and a user specific watermark that is specific to the first user. The first user is issued a digital certificate including watermark information corresponding to the content specific watermark and the user specific watermark in the copy of the digital asset purchased by the first user. A second user may also purchase a copy of the same digital asset, where the copy of the digital asset purchased by the second user is watermarked with the same content specific watermark and a user specific watermark that is specific to the second user. The second user is issued a digital certificate including watermark information corresponding to the content specific watermark and the user specific watermark in the copy of the digital asset purchased by the second user. Thereafter, if the second user loses his copy of the digital asset, the second user may obtain the copy of the digital asset from the first user. Then, access to the copy of the digital asset obtained from the first user may be controlled based on a comparison of the watermark information in the digital certificate of the second user and the watermarks in the copy of the digital asset obtained from the first user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
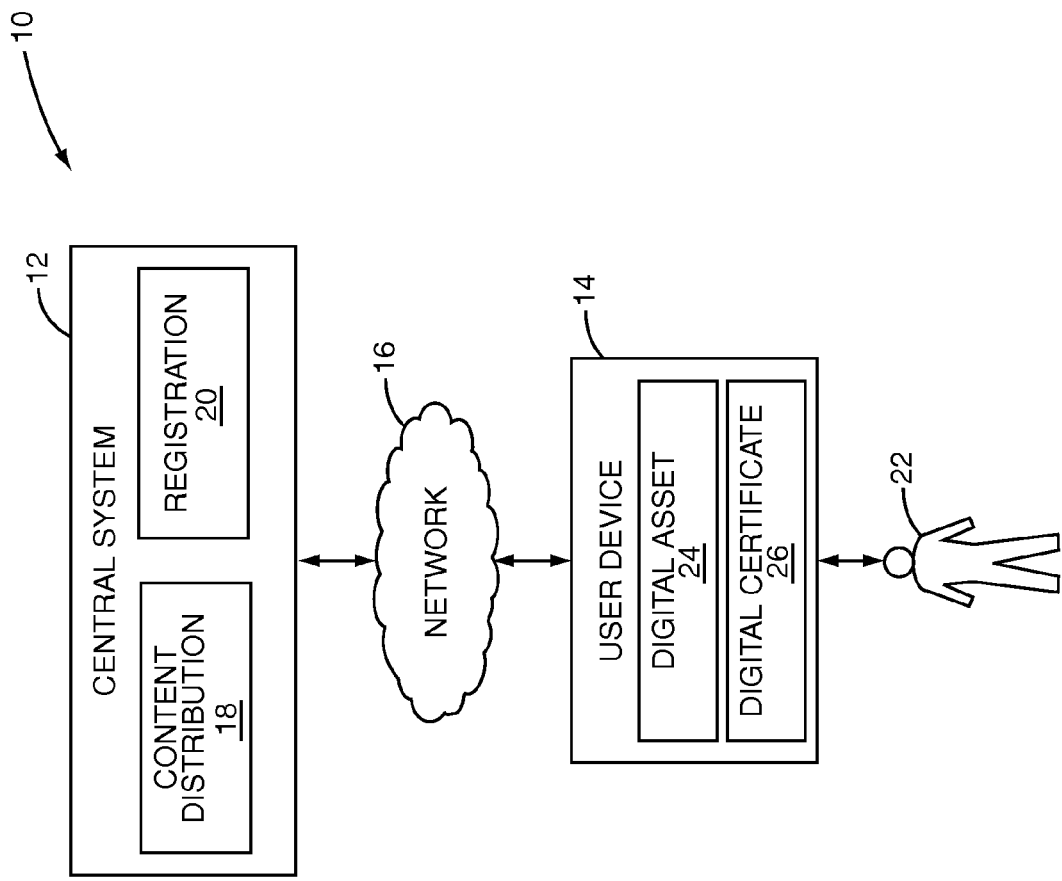
FIG. 1 illustrates a system providing Digital Rights Management (DRM) using multiple watermarks and a digital certificate according to one embodiment of the present invention.

FIG. 1 illustrates a system 10 providing Digital Rights Management (DRM) using multiple watermarks according to one embodiment of the present invention. In general, the system 10 includes a central system 12 interconnected to a user device 14 via a network 16. The network 16 may be any type of Wide Area Network (WAN), Local Area Network (LAN), or combination thereof and may include wired and/or wireless components. For example, the network 16 may be the Internet. The user device 14 may be connected to the network 16 via a wired interface; a local wireless interface operating according to, for example, one of the suite of IEEE 802.11 standards; a cellular interface operating according to, for example, a Time Division Multiple Access (TDMA) standard such as the Global System for Mobile Communications (GSM) standard, a Code Division Multiple Access (CDMA) standard such as the CDMA 2000 standard or the 3G Wideband CDMA (W-CDMA) standard; or the like.

The central system 12 may be implemented using one or more servers. In this embodiment, the central system 12 includes a content distribution function 18 and a registration function 20. However, the central system 12 may alternatively include only the content distribution function 18 or only the registration function 20.

The content distribution function 18 may be implemented in software, hardware, or a combination of software and hardware. In general, the content distribution function 18 enables users such as user 22 of the user device 14 to purchase copies of digital assets such as, for example, software, video games, songs, movies, television programs, or the like. As discussed below, a digital asset is watermarked with a content specific watermark that is common to all copies of the digital asset distributed by the content distribution function 18. A watermark is data that is encoded into digital content. In general, watermarks may be encoded into the digital content in either the spatial domain or the frequency domain. When the user purchases a copy of a digital asset, the content distribution function 18 watermarks the digital asset with a user specific watermark identifying the user 22 such that the copy of the digital asset purchased by the user 22 is watermarked with both the content specific watermark and the user specific watermark. The content distribution function 18 also generates a digital certificate including watermark information corresponding to the content specific watermark and user specific watermark in the purchased copy of the digital asset. The copy of the digital asset and the digital certificate are provided to the user device 14. Thereafter, access to the copy of the digital asset is controlled based on a comparison of the watermark information in the digital certificate and the watermarks in the digital asset.

The registration function 20 may be implemented in software, hardware, or a combination of software and hardware. In general, a hard copy of a digital asset, such as a Compact Disc (CD) or Digital Versatile Disc (DVD), may be purchased by a user such as the user 22. In this case, the copy of the digital asset is already watermarked with a content specific watermark that is common to all copies of the digital asset and a unique watermark that is to be associated with the user 22 during the registration process. As discussed below, during registration, the registration function 20 associates the unique watermark with the user 22. In addition, the registration function 20 generates a digital certificate including watermark information corresponding to the content specific watermark and the unique watermark and provides the digital certificate to the user device 14. Thereafter, access to the copy of the digital asset is controlled based on a comparison of the watermark information in the digital certificate and the watermarks in the copy of the digital asset.

The user device 14 may be, for example, a personal computer, a mobile device such as a Personal Digital Assistant (PDA) or mobile phone, a portable media player such as Apple's iPod® or Microsoft's Zune™ personal media player, a DVD player, or the like. In this embodiment, the user device 14 stores or has local access to a purchased copy of a digital asset 24 and a digital certificate 26 enabling access to the copy of the digital asset 24. The copy of the digital asset 24 and the digital certificate 26 may be stored by, for example, one or more hard drives, memory, one or more removable memory devices, an optical disc readable by an optical drive of the user device 14, or the like. Note that, as discussed below, the digital certificate 26 may additionally or alternatively be stored in a remote database and/or one or more additional devices associated with the user 22.

In operation, the user device 14 may interact with the content distribution function 18 of the central system 12 via the network 16 to purchase and download the copy of the digital asset 24. The copy of the digital asset 24 is watermarked with a content specific watermark and a user specific watermark. Based on the digital certificate 26, access to the copy of the digital asset 24, or access to any other copy of the digital asset subsequently transferred to the user device 14, is controlled.

Figure 2:
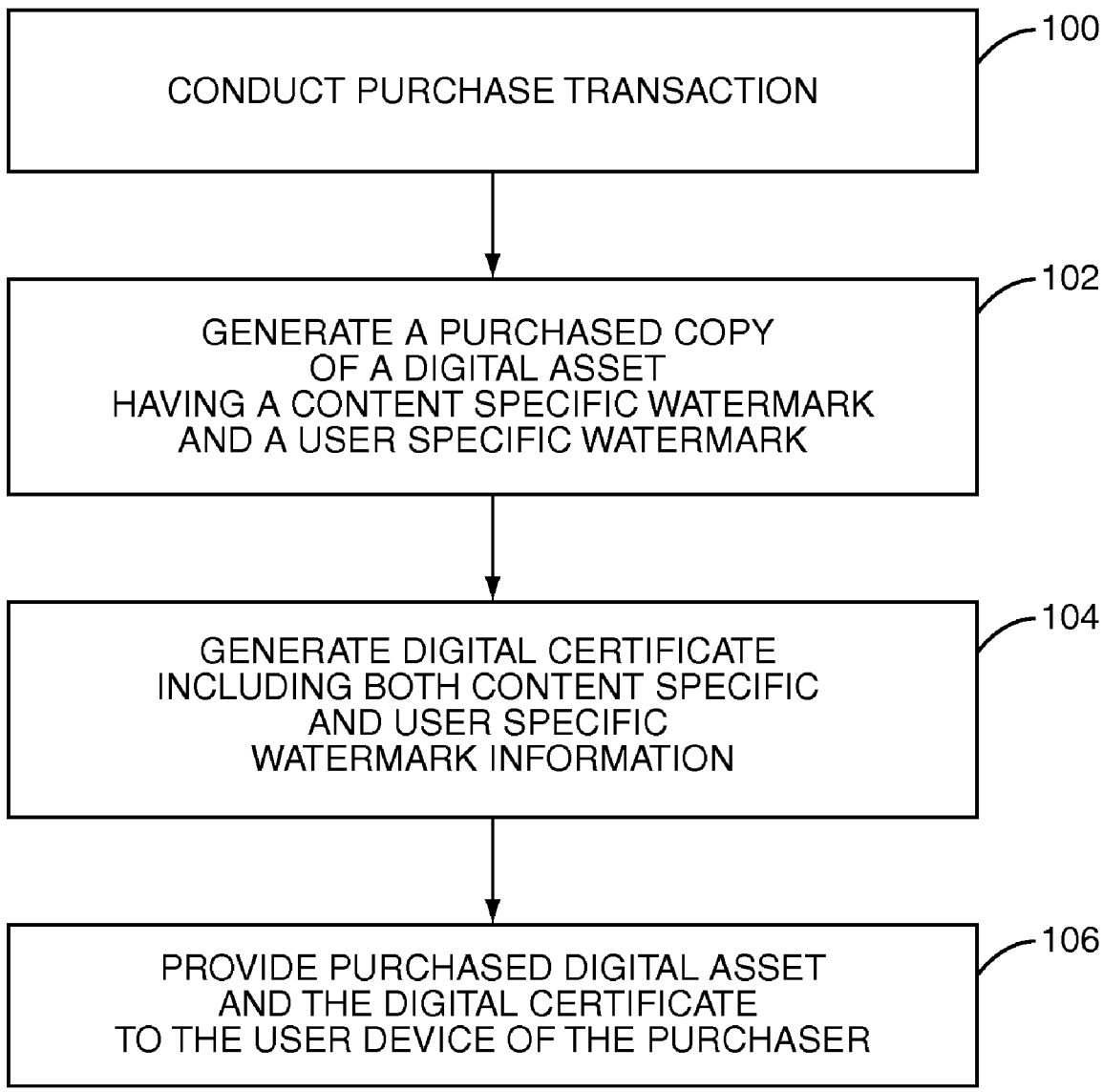
FIG. 2 illustrates the operation of the content distribution function of the central system of FIG. 1 according to one embodiment of the present invention.

FIG. 2 illustrates the operation of the content distribution function 18 of the central system 12 according to one embodiment of the present invention. First, using the user 22 as an example, the content distribution function 18 conducts a purchase transaction during which the user 22 purchases the copy of the digital asset 24 (step 100). Alternatively, if, for example, the content distribution function 18 provides a subscription-based service for content such as songs, the purchase transaction may be replaced with a verification process wherein the user 22 is verified as a subscriber of the service.

At some point either during or after the purchase transaction is complete, the content distribution function 18 generates the purchased copy of the digital asset 24 having the content specific watermark and the user specific watermark (step 102). In one embodiment, the digital asset may already include a content specific watermark. As such, the content distribution function 18 may further watermark the digital asset with the user specific watermark using any type of robust watermarking technique that is suitable for the digital asset such as, for example, a spatial domain watermarking technique or a frequency domain watermarking technique to provide the purchased copy of the digital asset 24. The user specific watermark generally includes information identifying the user 22, information identifying the user device 14, or a combination thereof. For example, the user specific watermark information may include information such as, but not limited to, the name of the user 22, the address of the user 22, the e-mail address of the user 22, a credit card number of a credit card issued to the user 22 and optionally used for the purchase transaction, an Internet Protocol (IP) address of the user device 14, a device serial number of the user device 14, or the like or any combination thereof.

The content distribution function 18 also generates a digital certificate including the content specific watermark information and the user, or purchaser, specific watermark information corresponding to the content specific watermark and the user specific watermark in the copy of the digital asset 24 to be provided to the user (step 104). In addition, the copy of the digital asset 24 provided to the user 22 may be encrypted using an encryption key that is common to all copies of the digital asset. As such, the digital certificate may also include a decryption key for decrypting any copy of the digital asset. The content distribution function 18 provides the purchased copy of the digital asset 24 and the digital certificate to the user device 14 of the user 22 (step 106).

As discussed below, access to the copy of the digital asset 24 at the user device 14 is controlled based on the digital certificate 26. Further, if the copy of the digital asset 24 is somehow corrupted or lost, the user 22 may obtain a new copy of the digital asset from the content distribution function 18 based on the digital certificate 26. Alternatively, the user 22 may obtain a copy of the digital asset from another user, where access to the other user's copy of the digital asset is controlled based on the digital certificate 26 issued to the user 22.

Figure 3:
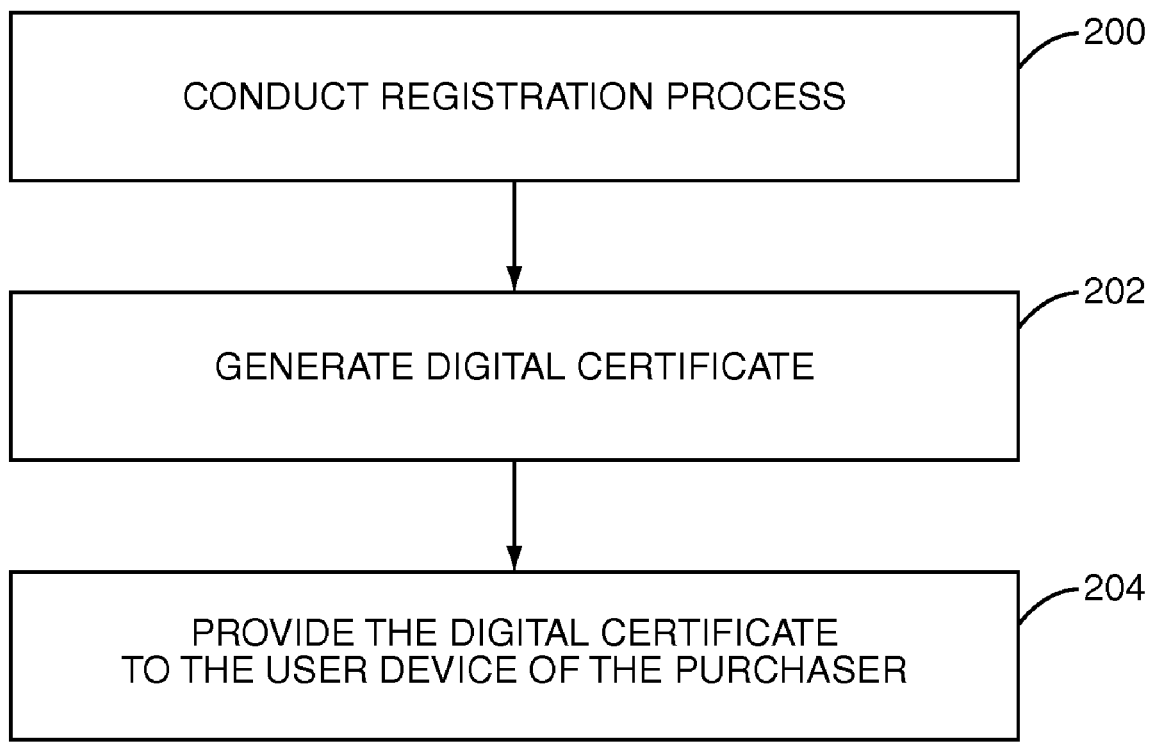
FIG. 3 illustrates the operation of the registration function of the central system of FIG. 1 according to one embodiment of the present invention.

FIG. 3 illustrates the operation of the registration function 20 of the central system 12 according to one embodiment of the present invention. In this embodiment, the copy of the digital asset 24 is a hard-copy of the digital asset purchased by the user 22. The registration function 20 generally operates to register the purchased hard-copy of a digital asset 24 and to generate a digital certificate for the copy of the digital asset 24. As used herein, a "hard-copy" of a digital asset is a copy of a digital asset purchased on a physical media such as, for example, a CD or DVD. The hard-copy of the digital asset 24 is watermarked with a content specific watermark that is common for all copies of the digital asset and a unique watermark that is to be associated with the user 22, or purchaser, during the registration process.

More specifically, at some point after purchasing the hard-copy of the digital asset 24, the user 22 or the user device 14 initiates a registration process with registration function 20 of the central system 12. At this point, the registration function 20 conducts the registration process (step 200). During the registration process, the registration function 18 obtains information identifying the user 22, the user device 14, or both. In addition, the registration function 20 obtains the unique watermark in the copy of the digital asset 24 purchased by the user. The registration function 18 then stores the information identifying the user 22 and/or the user device 14 in association with the unique watermark in a local or remote database associated with the central system 12. The information identifying the user 22 may include, for example, the user's name, the user's address, the user's e-mail address, a credit card number of a credit card issued to the user 22, or the like or any combination thereof. The information identifying the user device 14 may include, for example, the IP address of the user device 14, a device serial number of the user device, or the like or any combination thereof.

The registration function 20 also generates the digital certificate 26 including content specific watermark information and user, or purchaser, specific watermark information corresponding to the content specific watermark and the unique watermark in the copy of the digital asset 24 (step 202). Note that as used herein, a "user specific watermark" includes the unique watermark in a hard-copy of a purchased digital asset. In addition, the copy of the digital asset 24 purchased by the user 22 may be encrypted using an encryption key that is common to all copies of the digital asset. As such, the digital certificate 26 may also include a decryption key for decrypting any copy of the digital asset. The registration function 20 provides the digital certificate 26 to the user device 14 of the user 22 (step 204).

Figure 4:
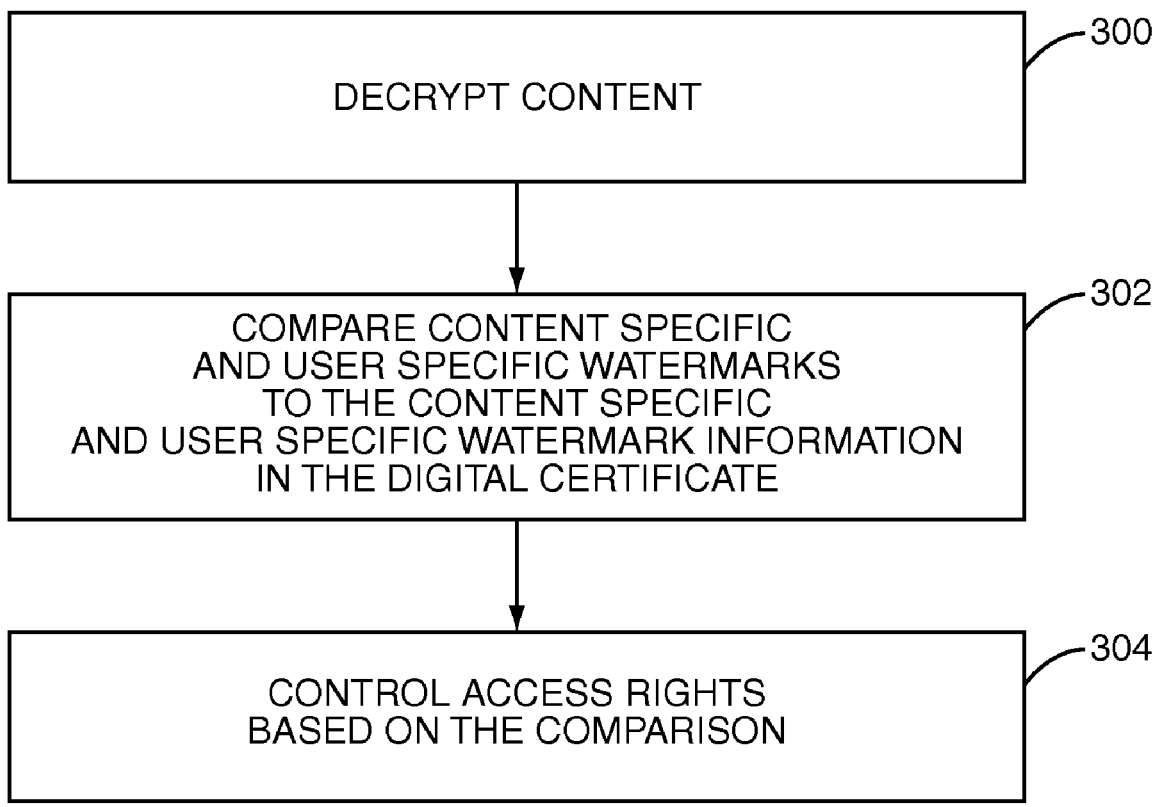
FIG. 4 illustrates the process of accessing a watermarked copy of a digital asset based on a digital certificate according to one embodiment of the present invention.

FIG. 4 illustrates an exemplary process for controlling access to the copy of the digital asset 24 at the user device 14 based on the digital certificate 26 according to one embodiment of the present invention. This process is equally applicable to controlling access to another user's copy of the digital asset at the user device 14. Optionally, if the copy of the digital asset 24 is encrypted, the copy of the digital asset 24 is decrypted (step 300). In one embodiment, the copy of the digital asset 24 is decrypted using a decryption key from the digital certificate 26, where the decryption key is common to all copies of the digital asset. Next, the content specific and user specific watermarks are extracted from the copy of the digital asset 24 and compared to the content specific and user specific watermark information in the digital certificate 26 (step 302).

Access to the copy of the digital asset 24 is then controlled based on the comparison of the content specific and user specific watermarks and the content specific and user specific watermark information in the digital certificate 26 (step 304). For example, full access may be provided if both the content specific watermark and the user specific watermark match the watermark information in the digital certificate 26. In contrast, if the copy of the digital asset 24 is corrupted or lost and the user 22 obtains a copy of the digital asset from another user, the content specific watermark will match the content specific watermark information in the digital certificate 26 but the user specific watermark will not match the user specific watermark information in the digital certificate 26. As such, the user 22 may be provided limited or user specific access to the copy of the digital asset from the other user. For example, if the digital asset is a movie and associated bonus features normally stored on a DVD, access to a copy of the digital asset obtained from another user may be limited to the movie such that the user 22 does not have access to the bonus features. Still further, if the user 22 obtains a copy of a digital asset for which the user 22 has no digital certificate, access may be entirely prohibited. Alternatively, access to a demo mode or preview of the digital asset may be provided in order to promote sales of the digital asset. Still further, if the digital asset has, for example, a basic mode and a professional mode, the content specific watermark may be different for the two modes. As such, if the user obtains a copy of a digital asset, increased access may be provided if the digital certificate of the user is for the professional mode, whereas the original owner has access to only the basic mode.

Steps 300-304 may be performed by the user device 14 under the instruction of the copy of the digital asset 24 itself or performed by a software and/or hardware application of the user device 14. More specifically, the digital asset may be a software application such as, for example, Microsoft Windows, one of the suite of Microsoft Office applications, Norton Internet Security, or the like. The software application may include instructions for performing steps 300-304 at startup of the application. In contrast, if the digital asset is a media file such as a song or movie, the user device 14 may include a software and/or hardware application for performing steps 300-304 before access to the media file is granted.

The access rights are preferably defined by the distributor, manufacturer, or the like of the digital asset. Note that the distributor and manufacturer may or may not be the same entity. More specifically, the manufacturer or distributor of the digital asset preferably defines what access rights are to be provided when both watermarks in the copy of the digital asset 24 match the watermark information in the digital certificate 26, when only the content specific watermark matches the watermark information in the digital certificate 26, and when the user 22 has no digital certificate for the digital asset. In one embodiment, access rights may be defined by limiting access to various portions of the content of the digital asset. This may be desired for digital assets such as songs or movies. Access rights may be defined by watermarking various portions of the copy of the digital asset 24 with corresponding combinations of the content specific watermark and the user specific watermark. Portions of the copy of the digital asset 24 that are to be accessible only by the original purchaser may be watermarked with both the content specific watermark and the user specific watermark. Alternatively, they may be watermarked with only the user specific watermark. Portions of the copy of the digital asset 24 that are to be accessible by any user having a digital certificate including watermark information matching the content specific watermark may be watermarked with only the content specific watermark. Finally, portions of the copy of the digital asset 24 that may be accessible by any user regardless of whether the user has a digital certificate for the digital asset may not be watermarked with either the content specific watermark or the user specific watermark. This may be desirable to identify portions of the digital asset that are to be accessible to provide a preview or demo of the asset.

In another embodiment, access rights may be defined to control the type of access to provide for the copy of the digital asset 24. For example, this may be done by defining access rights for a full access mode, a limited access mode, and a demo or preview mode. The full access mode may more generally be referred to as a purchaser mode. The limited access mode may more generally be referred to as a guest mode. This type of DRM scheme may be desirable for digital assets such as software applications, but is not limited thereto. Thus, if both the content specific watermark and the user specific watermark match the digital certificate 26, the user 22 is identified as the purchaser, and the copy of the digital asset 24 enters the full access mode of operation where the full access rights of the purchaser are provided. If the content specific watermark matches the digital certificate 26 but the user specific watermark does not match the digital certificate 26, then the user 22 is identified as a guest, and the copy of the digital asset 24 enters the limited access mode of operation where limited access rights may be provided. For example, the limited access mode may limit the number of copies of a song to one copy such that the guest may not copy the song to another device, whereas the full access mode may allow ten copies. If the user 22 does not have a digital certificate for the digital asset, then access to the copy of the digital asset 24 may be prohibited or the copy of the digital asset 24 may enter a demo or preview mode of operation.

Figure 5:
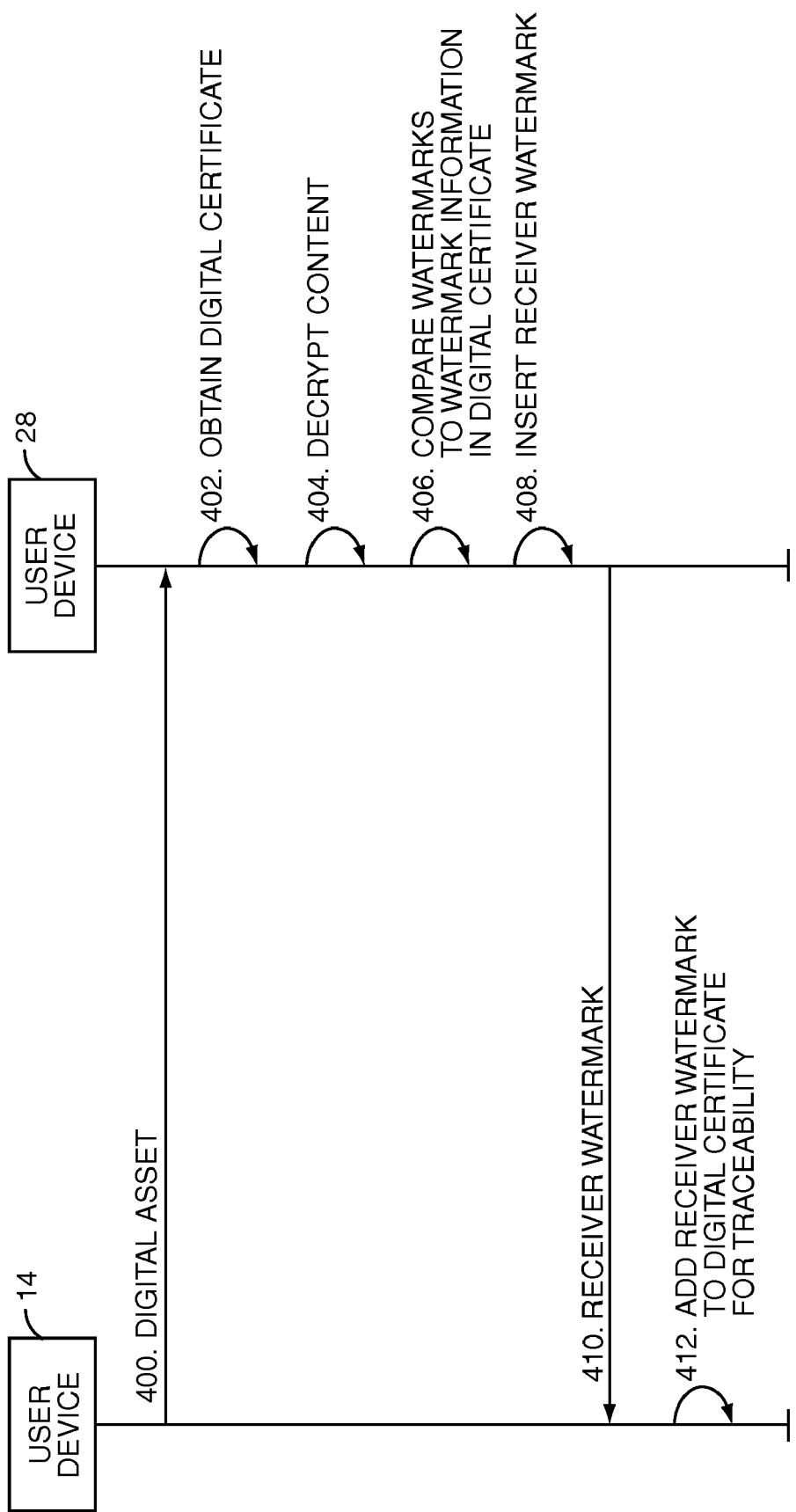
FIG. 5 illustrates the operation of the system of FIG. 1 to enable sharing of a digital asset with another user having a digital certificate for the digital asset according to one embodiment of the present invention.
Figure 6:
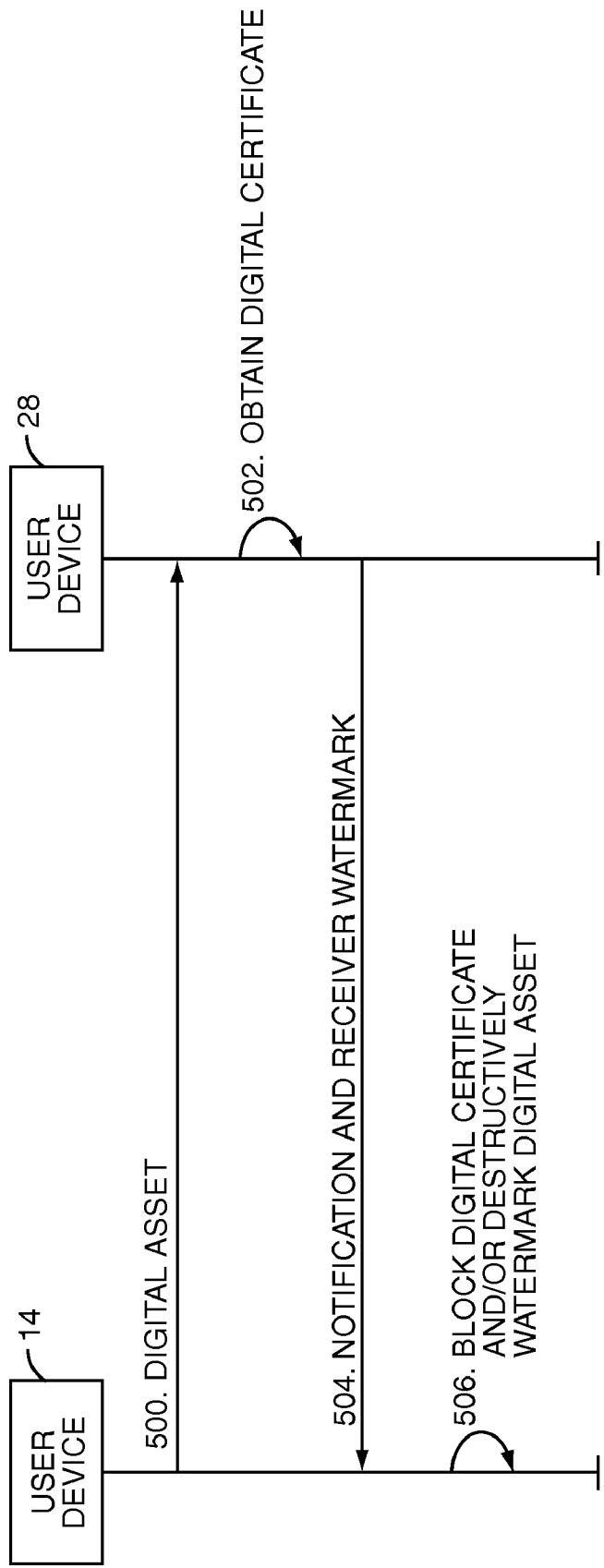
FIG. 6 illustrates the operation of the system of FIG. 1 to detect and deter sharing of a digital asset with another user not having a digital certificate for the digital asset according to one embodiment of the present invention.

FIGS. 5 and 6 illustrate the operation of the system of FIG. 1 to enable sharing of the copy of the digital asset 24 with another user according to one embodiment of the present invention. Sharing may be desired when, for example, a user's copy of the digital asset becomes corrupt or is lost. However, note that mass distribution of the digital asset and digital certificate is deterred by the user specific watermark and the user specific information in the digital certificate.

FIG. 5 illustrates the operation of the system 10 to enable sharing with a second user when the second user has a digital certificate for another copy of the same digital asset. More specifically, the copy of the digital asset 24 is provided to a user device 28 of a second user (step 400). The copy of the digital asset 24 may be provided to the user device 28 via the network 16, via a physical media such as a CD or DVD, or the like. The second user's digital certificate for the digital asset is then obtained from, for example, local storage of the user device 28 (step 402). If encrypted, the copy of the digital asset 24 is decrypted using the decryption key in the second user's digital certificate (step 404). The watermarks in the copy of the digital asset 24 are compared to the content specific watermark information and the user specific watermark information in the second user's digital certificate (step 406). Since the user specific watermark in the copy of the digital asset 24 does not match the user specific user information in the second user's digital certificate, limited access to the copy of the digital asset 24 may be provided.

A receiver watermark is then inserted into the copy of the digital asset 24 (step 408). The receiver watermark may include the user specific watermark information from the second user's digital certificate or other information identifying the second user and/or the user device 28. In one embodiment, the receiver watermark information is added for traceability purposes. The user specific watermark of the copy of the digital asset 24 is maintained and used to control access to the copy of the digital asset 24. In another embodiment, the user specific watermark in the copy of the digital asset 24 may be replaced by the receiver watermark, where the receiver watermark is thereafter used to control access at the user device 28. The user specific watermark in the copy of the digital asset 24 may still be maintained for traceability.

In this embodiment, the user device 28 may also provide the receiver watermark to the user device 14 (step 410). In response, the user device 14 may add the receiver watermark to the digital certificate 26 such that distribution of the copy of the digital asset 24 can be tracked (step 412). Alternatively, as discussed below, the digital certificate 26 may be stored by a remote database. In this case, the user device 14 may modify the digital certificate 26 stored in the remote database. As another alternative, either the user device 14 or the user device 28 may provide the receiver watermark to a remote server associated with the remote database, where the remote server adds the receiver watermark to the digital certificate 26.

FIG. 6 illustrates the operation of the system 10 when the copy of the digital asset 24 is shared with or otherwise obtained by the second user and the second user does not have a digital certificate for the digital asset. The copy of the digital asset 24 is provided to the user device 28 of the second user (step 500). The copy of the digital asset 24 may be provided to the user device 28 via the network 16, via a physical media such as a CD or DVD, or the like. An attempt is made to obtain or locate a digital certificate for the digital asset issued to the second user (step 502). In this example, the second user does not have a digital certificate for the digital asset. As such, a notification message and a receiver watermark are provided to the user device 14 (step 504). The notification message indicates that the second user does not have a digital certificate for the digital asset. The receiver watermark may include information identifying the second user, information identifying the second user device 28, or a combination thereof. Since the copy of the digital asset 24 has been illegally shared, or shared in a manner inconsistent with a user agreement with the manufacturer or distributor of the digital asset, the digital certificate 26 of the user 22 may be blocked and/or the copy of the digital asset 24 may be destructively watermarked in such a manner as to render the copy of the digital asset 24 useless if desired by the manufacturer or distributor of the digital asset (step 412). The illegally shared copy of the digital asset may then be identified as stolen and tracked such that the manufacturer or distributor may take legal action if desired.

Note that the system 10 may provide a process by which the user 22 may thereafter unblock the digital certificate 26 and/or obtain a new copy of the digital asset by, for example, providing the receiver watermark to the central system 12. This may be desirable where, for example, the user 22 did not know that the second user did not have a digital certificate for the digital asset or the copy of the digital asset 24 was stolen from the user 22.

Figure 7:
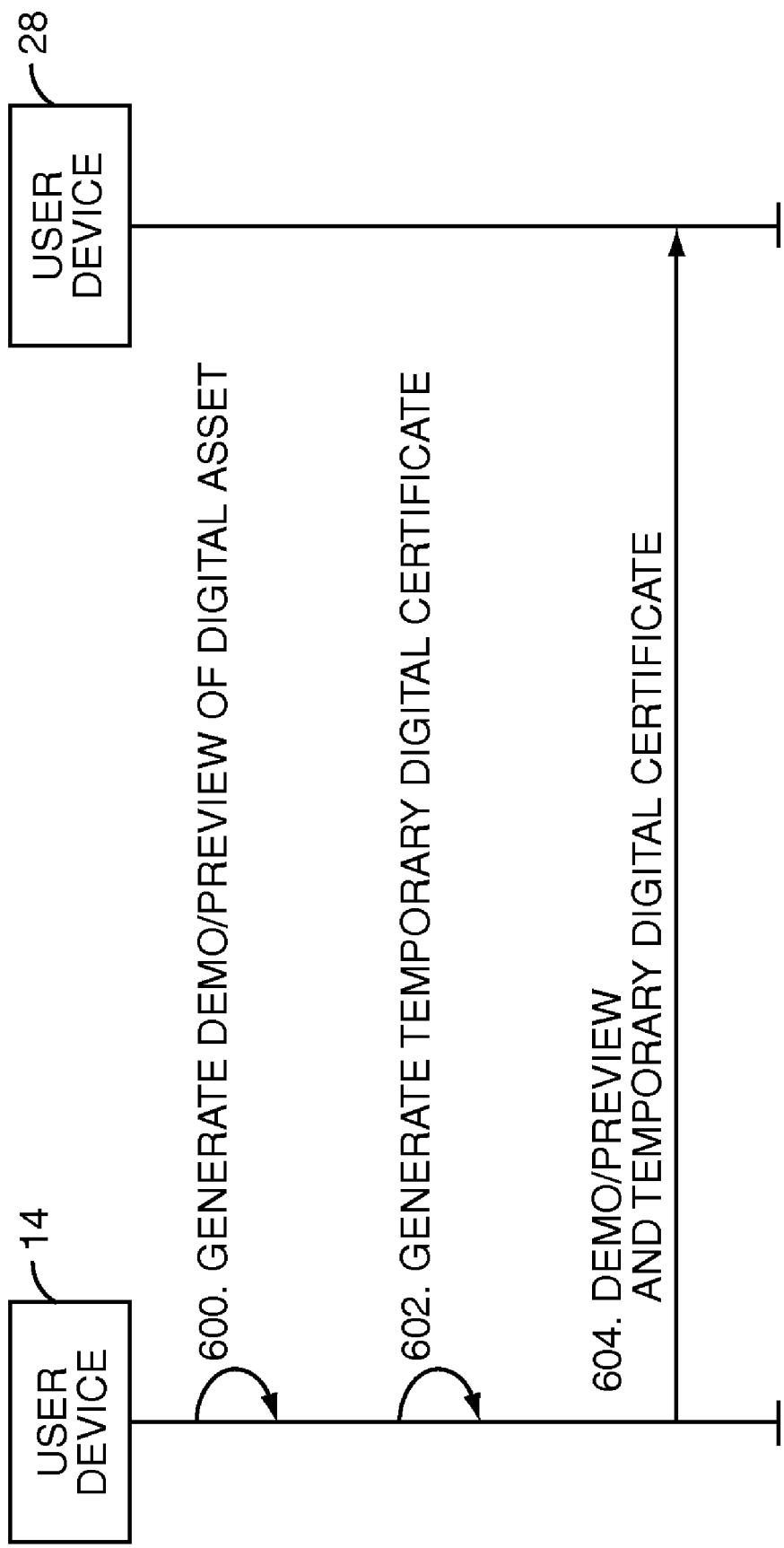
FIG. 7 illustrates the sharing of a demo or preview of a digital asset with another user not having a digital certificate for the digital asset according to one embodiment of the present invention.
Figure 8:
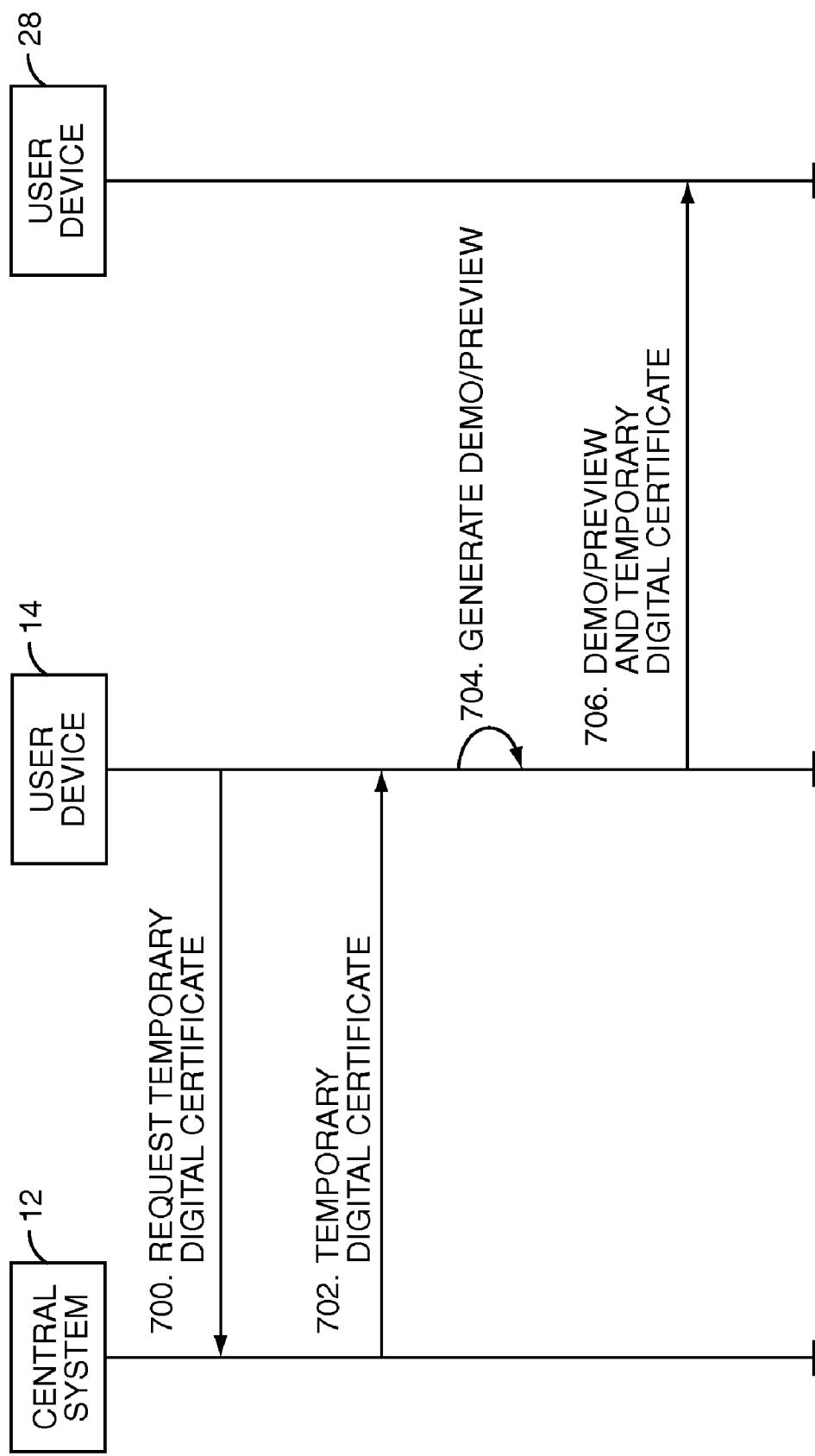
FIG. 8 illustrates the sharing of a demo or preview of a digital asset with another user not having a digital certificate for the digital asset according to another embodiment of the present invention.

FIGS. 7 and 8 illustrate exemplary processes by which the user 22 may share a demo or preview of the digital asset to the second user according to one embodiment of the present invention. Referring to FIG. 7, when the user 22 desires to share a demo or preview of the digital asset with the second user, the user device 14 may generate a demo or preview of the digital asset from the copy of the digital asset 24 (step 600). Note that step 600 may be optional. For example, the copy of the digital asset 24 may already be enabled to provide a preview or to operate in a demo mode. The user device 14 also generates a temporary digital certificate allowing access to the demo or preview of the digital asset (step 602). The demo or preview of the digital asset and the temporary digital certificate are then provided to the user device 28 of the second user (step 604). The demo or preview of the digital asset and the digital certificate may be provided to the second user via the network 16, via a physical media such as a CD or DVD, or the like. Note that, as mentioned above, the demo or preview of the digital asset may be the copy of the digital asset 24 where the temporary digital certificate provides limited access to the copy of the digital asset 24 to provide a preview or demo of the digital asset.

FIG. 8 illustrates another exemplary process by which the user 22 may provide a demo or preview of the digital asset to the second user. The user device 14 requests a temporary digital certificate from the central system 12 (step 700). In response, the central system 12 generates a temporary digital certificate and sends the temporary digital certificate to the user device 14 (step 702). Optionally, the user device 14 generates a demo or preview of the digital asset from the copy of the digital asset 24 (step 704). The demo or preview of the digital asset and the temporary digital certificate are then provided to the user device 28, where the temporary digital certificate provides access to the demo or preview of the digital asset (step 706).

Note that the processes of FIGS. 7 and 8 are exemplary. Numerous variations will be apparent to one of ordinary skill in the art upon reading this disclosure. For example, the central system 12 may provide the temporary digital certificate directly to the user device 28 of the second user. Alternatively, the central system 12, or the user device 14, may provide the temporary digital certificate to a database storing digital certificates for a number of users, where the database is accessible by the user device 28 of the second user. As another example, the user device 14 may request both the temporary digital certificate and the demo or preview of the digital asset from the central system 12. The temporary digital certificate and the demo or preview of the digital asset may then be provided to the user device 14 and thereafter provided to the user device 28. Alternatively, the central system 12 may provide the temporary digital certificate and the demo or preview of the digital asset to the user device 28 of the second user via, for example, the network 16. Again, note that the digital certificate may alternatively be stored in a remote database, as described below.

Figure 9:
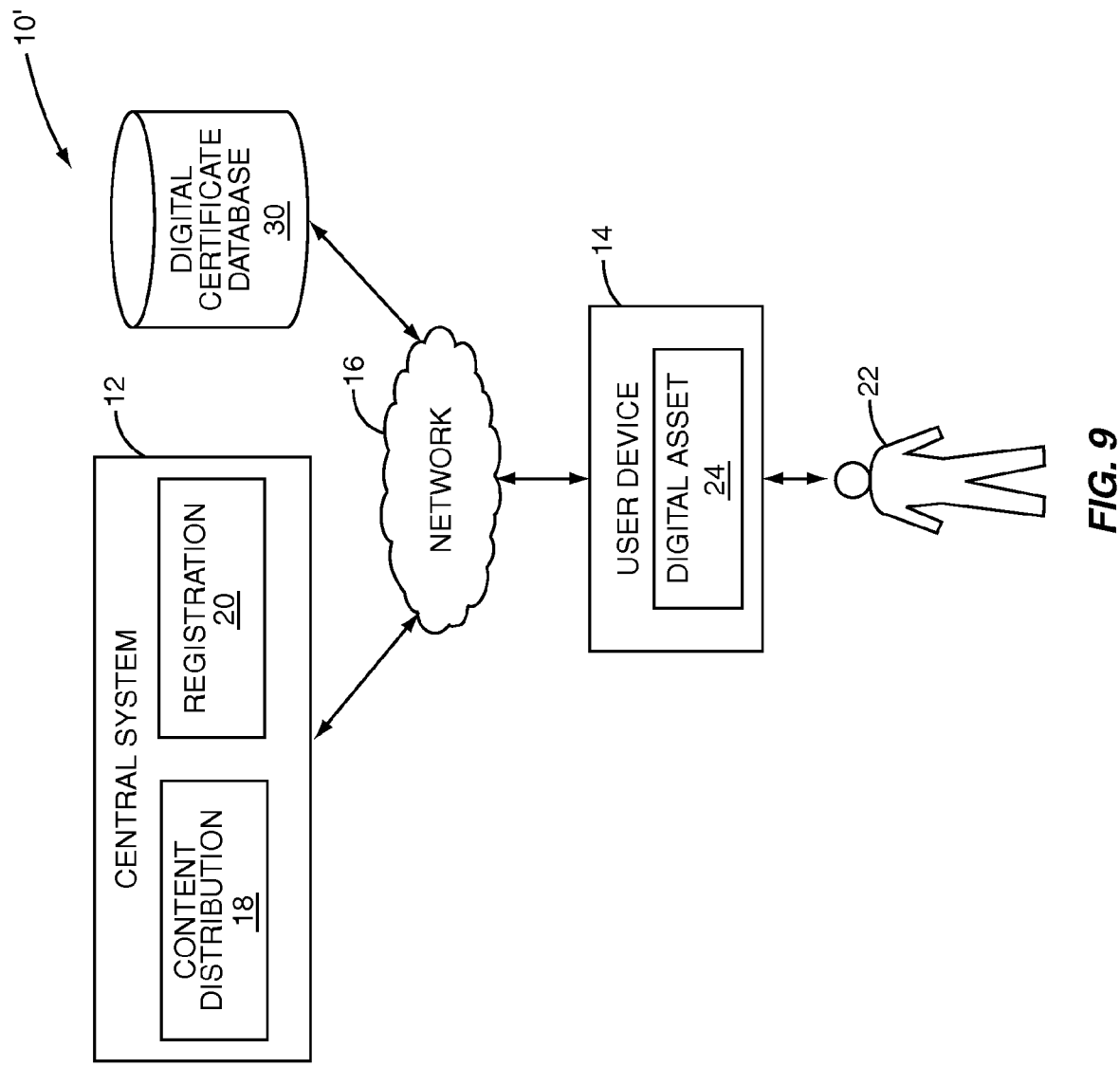
FIG. 9 illustrates a system providing DRM using multiple watermarks and a digital certificate according to a second embodiment of the present invention.

FIG. 9 illustrates the system 10' according to another embodiment of the present invention. In this embodiment, a remote digital certificate database 30 operates to store digital certificates. The digital certificate database 30 may be part of or associated with the central system 12. Alternatively, the digital certificate database 30 may be hosted by a remote server. The digital certificates stored at the digital certificate database 30 are preferably protected to prevent unauthorized users from gaining access to the digital certificates. For example, the digital certificate issued to the user 22 for the copy of the digital asset 24 may be encrypted using an encryption key generated based on a combination of a password provided by the user 22 and information identifying the user 22 or the user device 14 obtained during the purchase or registration transaction.

In one embodiment, the digital certificate database 30 operates as a backup mechanism. More specifically, in addition to storing the digital certificate for the copy of the digital asset 24 at the user device 14, the digital certificate is also stored in the digital certificate database 30. The digital certificate may be provided to the digital certificate database 30 by the content distribution function 18 or the registration function 20. Alternatively, the user device 14 may provide the digital certificate to the digital certificate database 30. Thereafter, the digital certificate database 30 may be used to replace a corrupted or lost digital certificate.

The digital certificate database 30 may also enable remote access to a digital asset at a user device other than the user device 14 of the user 22. For example, the user 22 may desire to access a copy of the digital asset stored on a remote device such as public device or a user device of another user. The user 22 may be required to enter, for example, a password enabling the remote device to obtain a temporary copy of the digital certificate 26 of the user 22 from the digital certificate database 30. Access to the copy of the digital asset at the remote device may then be controlled based on the temporary copy of the digital certificate. Note that the digital certificate database 30 may provide the temporary digital certificate in response to, for example, detecting that the request for the digital certificate came from an IP address other than the IP address of the user device 14 of the user 22. In contrast, if a request for the digital certificate 26 were to come from the user device 14, the digital certificate database 30 may provide a permanent copy of the digital certificate.

In another embodiment, the digital certificate database 30 operates as the permanent source of the digital certificates. In this embodiment, when the user 22 purchases or registers the copy of the digital asset 24, the digital certificate is generated and provided to the digital certificate database 30 for storage. Thereafter, when access to the copy of the digital asset 24 is desired, the user device 14 may obtain a temporary copy of the digital certificate from the digital certificate database 30 to be used to determine access rights in the manner described above. Alternatively, access rights may be determined in a collaborative fashion. For example, the user device 14 may interact with the digital certificate database 30 to obtain needed information such as the decryption key, the content specific watermark information, and the user specific watermark information from the digital certificate database 30. As yet another alternative, after decryption, the user device 14 may provide the content specific watermark and the user specific watermark to a server associated with the digital certificate database 30, where the server may perform the comparison of the watermarks and the watermark information from the digital certificate stored in the digital certificate database 30.

The digital certificate database 30 provides substantial benefits. First, as mentioned above, the digital certificate database 30 may be used to replace digital certificates that have been corrupted or lost due to, for example, a hard-drive failure. Using the user 22 as an example, if the hard-drive of the user device 14 fails, the user 22 may thereafter replace the digital certificate for the copy of the digital asset 24 and any other digital certificates issued to the user 22 from the digital certificate database 30. The user device 14 could then obtain a new copy of the purchased digital asset from the content distribution system 18; other user devices via, for example, a peer-to-peer (P2P) network; the user's own hard-copy of the digital asset; or a hard-copy of the digital asset owned by another user.

The digital certificate database 30 may be used to access digital certificates from a new or secondary user device associated with the user 22. The digital certificates may be downloaded to the new or secondary user device for permanent storage or may be accessible from the digital certificate database 30 when needed. Using the digital certificates, the new or secondary device may download copies of the purchased digital assets from the central system 12 or gain access to copies of the purchased digital assets from other users.

Figure 10:
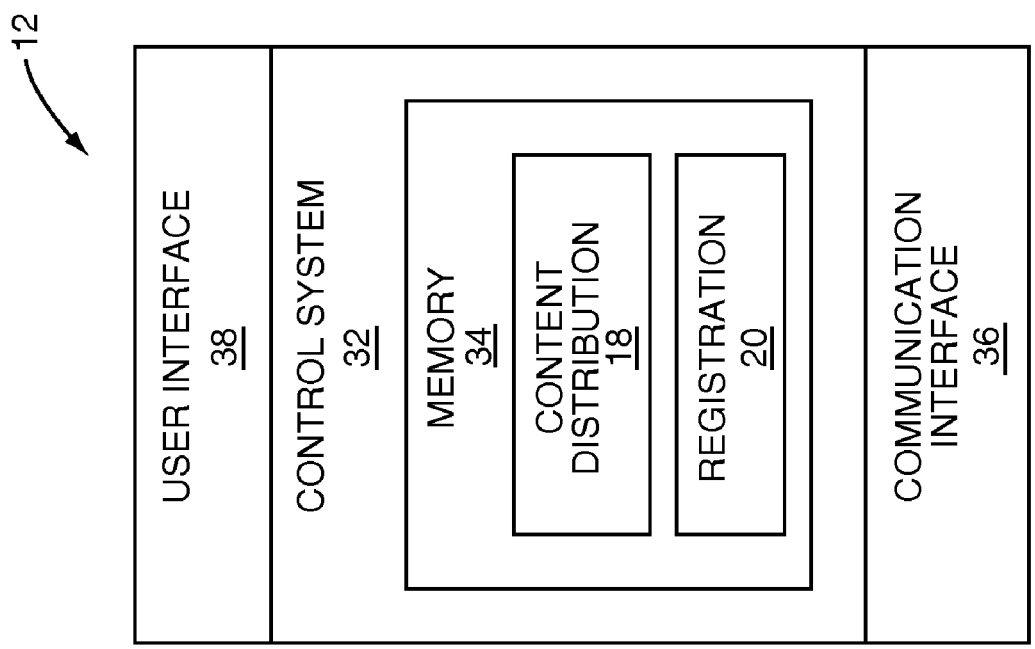
FIG. 10 is a block diagram of the central system of FIGS. 1 and 9 according to one embodiment of the present invention.

FIG. 10 is a block diagram of the central system 12 of FIGS. 1 and 9 according to one embodiment of the present invention. In general, the central system 12 includes a control system 32 having associated memory 34. In this example, the content distribution function 18 and the registration function 20 are implemented in software and stored in the memory 34. However, the present invention is not limited thereto. In addition, the central system 12 includes a communication interface 36 communicatively coupling the central system 12 to the network 16 (FIGS. 1 and 9). The central system 12 may also include a user interface 38, which may include components such as a display and one or more user input devices.

Figure 11:
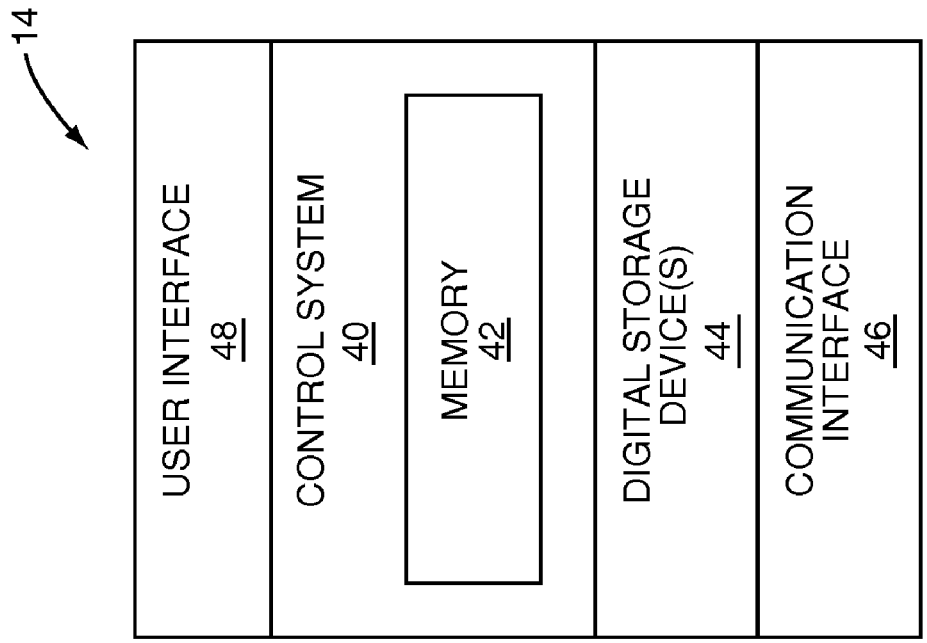
FIG. 11 is a block diagram of the user device of FIGS. 1 and 9 according to one embodiment of the present invention.

FIG. 11 is a block diagram of the user device 14 of FIGS. 1 and 9 according to one embodiment of the present invention. In general, the user device 14 includes a control system 40, which may include associated memory 42. The user device 14 also includes one or more digital storage devices 44, which operate to store the copy of the digital asset 24 and optionally the digital certificate 26. The one or more digital storage devices 44 may be, for example, one or more hard disc drives, internal or removable memory, optical storage devices such as CD or DVD drives, or the like. The user device 14 also includes a communication interface 46 communicatively coupling the user device 14 to the network 16 (FIGS. 1 and 9). The user device 14 also includes a user interface 48, which may include components such as, for example, a display, speaker, one or more user input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A method for controlling access to a copy of a digital asset watermarked with a content specific watermark and a user specific watermark comprising:
   comparing the content specific watermark in the copy of the digital asset to content specific watermark information in a digital certificate;
   comparing the user specific watermark in the copy of the digital asset to user specific watermark information in the digital certificate;
   controlling access to the copy of the digital asset based on comparing the content specific watermark to the content specific watermark information in the digital certificate and comparing the user specific watermark to the user specific watermark information in the digital certificate, wherein first portions of the copy of the digital asset are watermarked with the content specific watermark and the user specific watermark and second portions of the copy of the digital asset are watermarked with the content specific watermark but not the user specific watermark;
   providing full access to the copy of the digital asset if the content specific watermark matches the content specific watermark information in the digital certificate and the user specific watermark matches the user specific watermark information in the digital certificate; and
   providing access to the second portions of the copy of the digital asset but not the first portions of the copy of the digital asset if the content specific watermark matches the content specific watermark information in the digital certificate but the user specific watermark does not match the user specific watermark information in the digital certificate.

2. The method of claim 1 further comprising prohibiting access to the copy of the digital asset if no digital certificate is identified having content specific watermark information matching the content specific watermark in the copy of the digital asset.

3. The method of clam 1 further comprising providing access to a demo of the copy of the digital asset if no digital certificate is identified having content specific watermark information matching the content specific watermark in the copy of the digital asset.

4. The method of clam 1 further comprising providing access to a preview of the copy of the digital asset if no digital certificate is identified having content specific watermark information matching the content specific watermark in the copy of the digital asset.

5. The method of claim 1 controlling access to the copy of the digital asset further comprises:
   providing access to the first portions and the second portions of the copy of the digital asset if the content specific watermark matches the content specific watermark information in the digital certificate and the user specific watermark matches the user specific watermark information in the digital certificate.

6. The method of claim 1 further comprising storing the copy of the digital asset and the digital certificate locally at a user device.

7. The method of claim 1 further comprising obtaining the digital certificate from a remote database.

8. The method of claim 1 wherein the digital certificate is stored in a remote database associated with a server, and:
   comparing the content specific watermark in the copy of the digital asset to the content specific watermark information in the digital certificate comprises providing the content specific watermark to the server and comparing the content specific watermark to the content specific watermark information at the server; and
   comparing the user specific watermark to the user specific watermark information comprises providing the user specific watermark to the server and comparing the user specific watermark to the user specific watermark information at the server.

9. The method of claim 1 further comprising:
   purchasing the copy of the digital asset during a purchase transaction with a server, wherein in response the server generates the copy of the digital asset having the content specific watermark and the user specific watermark and generates the digital certificate including the content specific watermark information corresponding to the content specific watermark and the user specific watermark information corresponding to the user specific watermark; and
   receiving the copy of the digital asset and the digital certificate from the server.

10. The method of claim 1 wherein a user purchases the copy of the digital asset having the content specific watermark and a unique watermark, and the method further comprises:

registering the copy of the digital asset with a server, wherein in response the server identifies the unique watermark as the user specific watermark and generates the digital certificate including the content specific watermark information corresponding to the content specific watermark and the user specific watermark information corresponding to the user specific watermark; and receiving the digital certificate from the server.

11. The method of claim 1 further comprising decrypting the copy of the digital asset based on a decryption key in the digital certificate, wherein the decryption key is common to each of a plurality of copies of the digital asset including the copy of the digital asset.

12. The method of claim 1 wherein access to the copy of the digital asset is controlled at a first user device associated with a first user to which the digital certificate is issued, and the method further comprises obtaining the copy of the digital asset from a second user such that the user specific watermark identifies the second user.

13. The method of claim 12 further comprising watermarking the copy of the digital asset with a receiver watermark identifying at least one of a group consisting of: the first user device and the first user.

14. The method of claim 13 further comprising providing information corresponding to the receiver watermark to the second user device, wherein the second user device operates to insert the information corresponding to the receiver watermark to a digital certificate issued to second user for the copy of the digital asset.

15. The method of claim 13 further comprising providing information corresponding to the receiver watermark to a remote server, wherein the remote server operates to add the information corresponding to the receiver watermark to a digital certificate issued to second user for the copy of the digital asset.

16. The method of claim 12 further comprising effecting blocking of a digital certificate issued to the second user for the copy of the digital asset if the first user has not been issued a digital certificate for the digital asset.

17. The method of claim 12 further comprising effecting destructive watermarking of the copy of the digital asset at the second user device if the first user has not been issued a digital certificate for the digital asset.

18. The method of claim 12 wherein controlling access to the copy of the digital asset comprises controlling access to the copy of the digital asset to provide one of a group consisting of: a demo version of the digital asset or a preview of the digital asset if the first user has not been issued a digital certificate for the digital asset.

19. A method of sharing a digital asset comprising:
conducting a purchase transaction during which a first user and a second user each purchase first and second copies of a digital asset, wherein the first and second copies of the digital asset are watermarked with a content specific watermark;

watermarking the first copy of the digital asset with a first user specific watermark unique to the first user to provide a first watermarked copy of the digital asset that is watermarked with the content specific watermark and the first user specific watermark;

watermarking the second copy of the digital asset with a second user specific watermark unique to the second user to provide a second watermarked copy of the digital asset that is watermarked with the content specific watermark and the second user specific watermark;

generating a first digital certificate including content specific watermark information corresponding to the content specific watermark and first user specific watermark information corresponding to the first user specific watermark;

generating a second digital certificate including the content specific watermark information corresponding to the content specific watermark and second user specific watermark information corresponding to the second user specific watermark; and providing the first watermarked copy of the digital asset and the first digital certificate to a first user device associated with the first user such that access to the copy of the digital asset at the first user device is controlled based on a comparison of the content specific watermark and the first user specific watermark to the content specific watermark information and the first user specific watermark information in the first digital certificate, wherein first portions of the copy of the digital asset are watermarked with the content specific watermark and the user specific watermark and second portions of the copy of the digital asset are watermarked with the content specific watermark but not the user specific watermark;

providing the first watermarked copy of the digital asset to a second user device associated with the second user;

comparing the content specific watermark in the first watermarked copy of the digital asset to the content specific watermark information in the second digital certificate and comparing the first user specific watermark in the first watermarked copy of the digital asset to the second user specific watermark information in the second digital certificate; and providing access to the second portions of the copy of the digital asset but not the first portions of the copy of the digital asset if the content specific watermark matches the content specific watermark information in the digital certificate but the user specific watermark does not match the user specific watermark information in the digital certificate.

20. A method comprising:
conducting a registration process during which a user registers a copy of a digital asset previously purchased by the user, the copy of the digital asset having a content specific watermark and a user specific watermark;

generating a digital certificate including content specific watermark information corresponding to the content specific watermark and user specific watermark information corresponding to the user specific watermark, wherein first portions of the copy of the digital asset are watermarked with the content specific watermark and the user specific watermark and second portions of the copy of the digital asset are watermarked with the content specific watermark but not the user specific watermark; and providing the digital certificate to a user device associated with the user, such that access to the copy of the digital asset at the user device is controlled based on a comparison of the content specific watermark and the user specific watermark to the content specific watermark information and the user specific watermark information in the digital certificate, wherein access is provided to the second portions of the copy of the digital asset but not the first portions of the copy of the digital asset if the content specific watermark matches the content specific watermark information in the digital certificate but the user specific watermark does not match the user specific watermark information in the digital certificate.

21. The method of claim 20 wherein the copy of the digital asset is located at the user device, and conducting the registration process comprises:
   receiving the unique watermark from the user device;
   receiving information identifying the user from the user device; and
   associating the unique watermark with the information identifying the user.

22. The method of claim 20 wherein the copy of the digital asset is located at the user device, and conducting the registration process comprises:
   receiving the unique watermark from the user device;
   receiving information identifying the user device; and
   associating the unique watermark with the information identifying the user device.

* * * * *